(12) United States Patent
Zumbiel

(10) Patent No.: US 10,619,307 B2
(45) Date of Patent: Apr. 14, 2020

(54) SUPPORT NEEDLES FOR LASER CUTTING OF PAPERBOARD

(71) Applicant: The C.W. Zumbiel Company, Hebron, KY (US)

(72) Inventor: Edward A. Zumbiel, Union, KY (US)

(73) Assignee: The C.W. Zumbiel Company, Hebron, KY (US)

(*) Notice: Subject to any disclaimer, the term of this patent is extended or adjusted under 35 U.S.C. 154(b) by 732 days.

(21) Appl. No.: 15/168,294

(22) Filed: May 31, 2016

(65) Prior Publication Data

US 2016/0361781 A1 Dec. 15, 2016

Related U.S. Application Data

(60) Provisional application No. 62/174,578, filed on Jun. 12, 2015.

(51) Int. Cl.
B23K 37/04 (2006.01)
D21H 25/04 (2006.01)
B23K 26/08 (2014.01)
B23K 26/38 (2014.01)
B23K 37/02 (2006.01)
B23K 26/402 (2014.01)
B23K 103/00 (2006.01)

(52) U.S. Cl.
CPC ......... D21H 25/04 (2013.01); B23K 26/0838 (2013.01); B23K 26/38 (2013.01); B23K 26/402 (2013.01); B23K 37/0235 (2013.01); B23K 37/0408 (2013.01); B23K 2103/40 (2018.08)

(58) Field of Classification Search
None
See application file for complete search history.

(56) References Cited

U.S. PATENT DOCUMENTS

| 3,612,814 | A | * | 10/1971 | Houldcroft | ............ | B23K 26/10 |
| | | | | | | 219/121.67 |
| 4,039,799 | A | | 8/1977 | Stumpf | | |
| 4,312,254 | A | | 1/1982 | Pearl | | |
| 4,637,206 | A | | 1/1987 | Suwa | | |
| 5,450,333 | A | * | 9/1995 | Minami | ............. | B23K 26/0846 |
| | | | | | | 700/167 |
| 7,578,954 | B2 | * | 8/2009 | Gartstein | .......... | A61M 37/0015 |
| | | | | | | 264/154 |
| 2013/0126489 | A1 | | 5/2013 | Buschulte | | |
| 2013/0277341 | A1 | | 10/2013 | Dvorkin | | |
| 2013/0292226 | A1 | | 11/2013 | Ben-David et al. | | |

FOREIGN PATENT DOCUMENTS

WO 2013076716 A2 5/2013

* cited by examiner

*Primary Examiner* — Monica A Huson
*Assistant Examiner* — Kelsey C Grace
(74) *Attorney, Agent, or Firm* — Wood Herron & Evans LLP

(57) ABSTRACT

A support system for holding a sheet of material being cut by a laser has a base and a number of needles extending upwardly from the base. A vacuum generator or suction mechanism is in communication with a lumen in each needle to hold the sheet atop the bed of needles and spaced from the base so as to avoid scorching the sheet by the laser.

16 Claims, 2 Drawing Sheets

SUPPORT NEEDLES FOR LASER CUTTING OF PAPERBOARD

This claims the benefit of U.S. Provisional Patent Application Ser. No. 62/174,578, filed Jun. 12, 2015 and hereby incorporated by reference in its entirety.

BACKGROUND OF THE INVENTION

This invention generally relates to the cutting and creasing industry, and more particularly to a system for and method of cutting paperboard and other materials for packages.

Packaging is an important aspect of marketing. The package in which goods are packed and presented, in a store for example, may determine if the goods will be appealing to a potential buyer in the store or not. Thus the packaging appearance can have a direct effect on the sales of merchandise.

A known preliminary requirement to construct a package is preparing or purchasing a pre-treated paperboard and/or plastic and/or paper based material. Paper based material may be of different types. Exemplary types may be: waxed paper, cartridge paper, art paper, etc. Henceforth, throughout the description, drawings and claims of this disclosure, the terms paperboard, paperboard, card-stock, display board, corrugated fiberboard, paperboards of different paper based material, folding boxboard, carton, blanks, blister cards, plastics, boards/papers with enhancement (UV coating, printing, for example) and lamination, and so on, may be used interchangeably. This disclosure may use the term paperboard as a representative term for the above group as well as variations thereof.

The pre-treatment of paperboard may include the following acts: creating folding lines along the paperboard to ease and provide accurate folding of the paperboard; piercing the paperboard in different areas; creating embossment in different areas of the paperboard; cutting the raw paperboard into predefined profiles; and so on.

Some common techniques for preparing a pre-treated paperboard include the acts of placing the paperboard between dies. Exemplary types of dies include a cutting-die; a creasing-die; an embossing-die; a scoring-die; a combination of the different types of dies; and so on. Other known techniques for preparing pre-treated paperboard may include the use of laser. One known technique for cutting board is described in U.S. Published Patent Application No. 2013/0126489, which is incorporated by reference entirely herein.

When laser beam is used for cutting paperboards, burn marks may be formed on the paperboard itself. This may damage the esthetics of the paperboard and resulting package. Further the laser beam may damage the system itself in the long run.

One paperboard-handling system disclosed in the '489 patent application includes an under-laser raiser. Such an under-laser raiser may prevent burn marks (from smoke, and/or reflections of the laser's beam, for example) on the paperboard. Furthermore the under-laser raiser may protect the substrate and/or area underneath the paperboard from the heat of the laser beam.

The under-laser raiser of the '489 patent application has a plurality of protruding elements, substantially parallel one to the other. The plurality of protruding elements protrudes from a base. The protruding elements have a needle-like shape. A paperboard is placed in a substantially horizontal position on the top of the protruding elements.

A coupling and stabling mechanism is used to couple and stabilize the paperboard to the top of the protruding elements. The coupling and stabling mechanism includes a plurality of gaps (openings) in the base and a suction mechanism. The gaps are holes. The suction mechanism is a vacuum generator. The suction mechanism is intended to couple and stabilize the paperboard to the top of the protruding elements.

The vacuum is intended to hold the paperboard, blanks, and/or other cut parts (of the paperboard, for example) in required position on the under-laser raiser. This may be advantageously when the paperboard has been pretreated and parts of it are cut/and/or creased and thus may be free from other holding means. The vacuum may also evacuate the smoke caused by treatment of the paperboard by the laser beam, and advantageously prevent burn marks on the paperboard.

The system of the '489 application relies upon the retention of the paperboard on the tips of the protruding elements via the vacuum or suction generated by the suction mechanism communicated to the paperboard through the holes or gap in the base from which the elements protrude. The effectiveness of such a retention mechanism is due in large part to the ability of the suction mechanism to act upon the paperboard spaced from the holes in the base by the protruding elements. Such an arrangement requires a closed system surrounding the base, protruding element and paperboard arrangement and/or a powerful suction mechanism. Such requirements tend to be a restriction on the efficient, consistent and reliable processing of the paperboard through the system, among other drawbacks.

An improved system and method for laser cutting paperboard to address these and other identified drawbacks with the invention of the '489 application and other prior systems are needed and provided by this invention as disclosed herein below.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
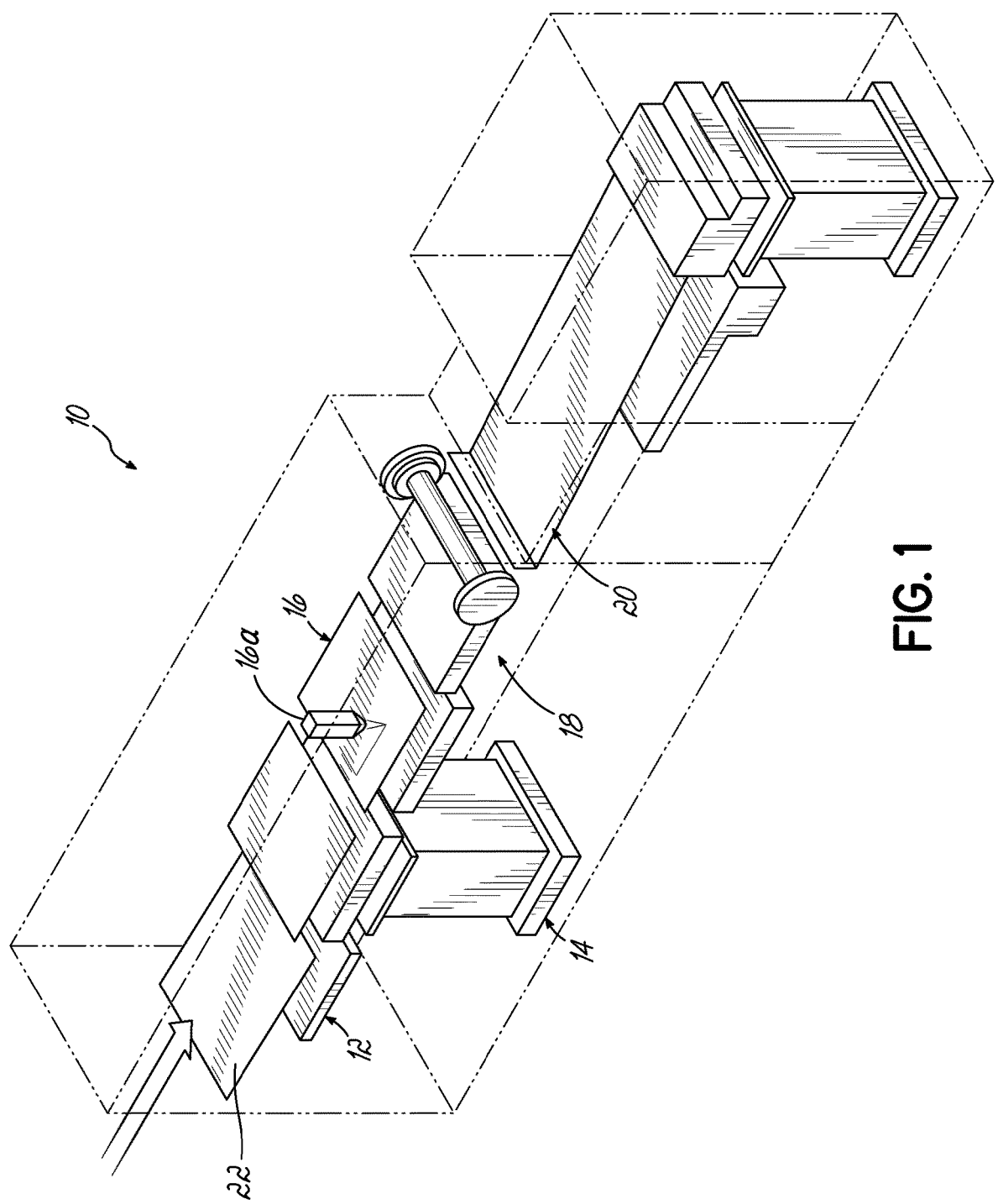
FIG. 1 is a schematic view of an exemplary system for processing paperboard into carton blanks in which this invention may be utilized.

Turning now to the drawings in which like numerals and/or labels represent like elements throughout the several views, exemplary embodiments of this invention are described. For convenience, only some elements of the same group may be labeled with numerals. The purpose of the drawings is to describe exemplary embodiments and is not for production purpose. Therefore features shown in the drawings are for illustration purposes only and are not necessarily drawn to-scale and were chosen only for convenience and clarity of presentation.

FIG. 1 is a schematic diagram illustrating various exemplary elements of an exemplary embodiment of a paperboard-processing system 10. Examples of existing systems for processing paperboard into package blanks are available from Bobst North America, Inc. www.bobst.com. The illustrated exemplary embodiment of the paperboard-processing system 10 is shown to include a feeder station 12, a die-rule and counter-die station 14, a laser cutting station 16, a stacker 18, a controller (not shown) and a conveyor 20.

In operation, initially the feeder station 12 gets a paperboard item 22 and feeds it toward the conveyor 20. The conveyor 20 may convey the paperboard item 22 toward and/or through the die-rule and counter-die station 14. The die-rule and counter-die station 14 operates to pre-treat the paperboard 22 and can include one or more of a variety of operations, including, but not limited to, adding creases, cuttings, embossing of areas, piercing, apertures, indentations, scoring, printing, etc.

Next the conveyor 20 may convey the pre-treated paperboard item 22 toward the laser station 16 to be further treated, for example, by a laser 16a cutting the paperboard item. The conveyor 20 may then convey the paperboard 22 toward the stacker 18. The stacker 18 may stack the paperboard items 22 into a pile or stack. The controller may synchronize and control one or more of the modules or stations of the paperboard-handling system 10.

The controller may get input signals or data from different sensors along the paperboard-handling system 10, and accordingly, respond by sending commands to one or more modules. These commands may include, but are not limited to: setting the velocity of the conveyor, starting/stopping operation, grabbing/releasing paperboard, setting motion direction of the paperboard to forward or backward, as well as other commands and/or combination of two or more of any of these commands. In some embodiments, the controller may get information from an operator. Other examples of paperboard-handling system 10 may comprise other modules, more of the same modules, only some of the described modules, etc. and as such, the configurations illustrated in FIG. 1 are non-limiting examples.

Figure 2:
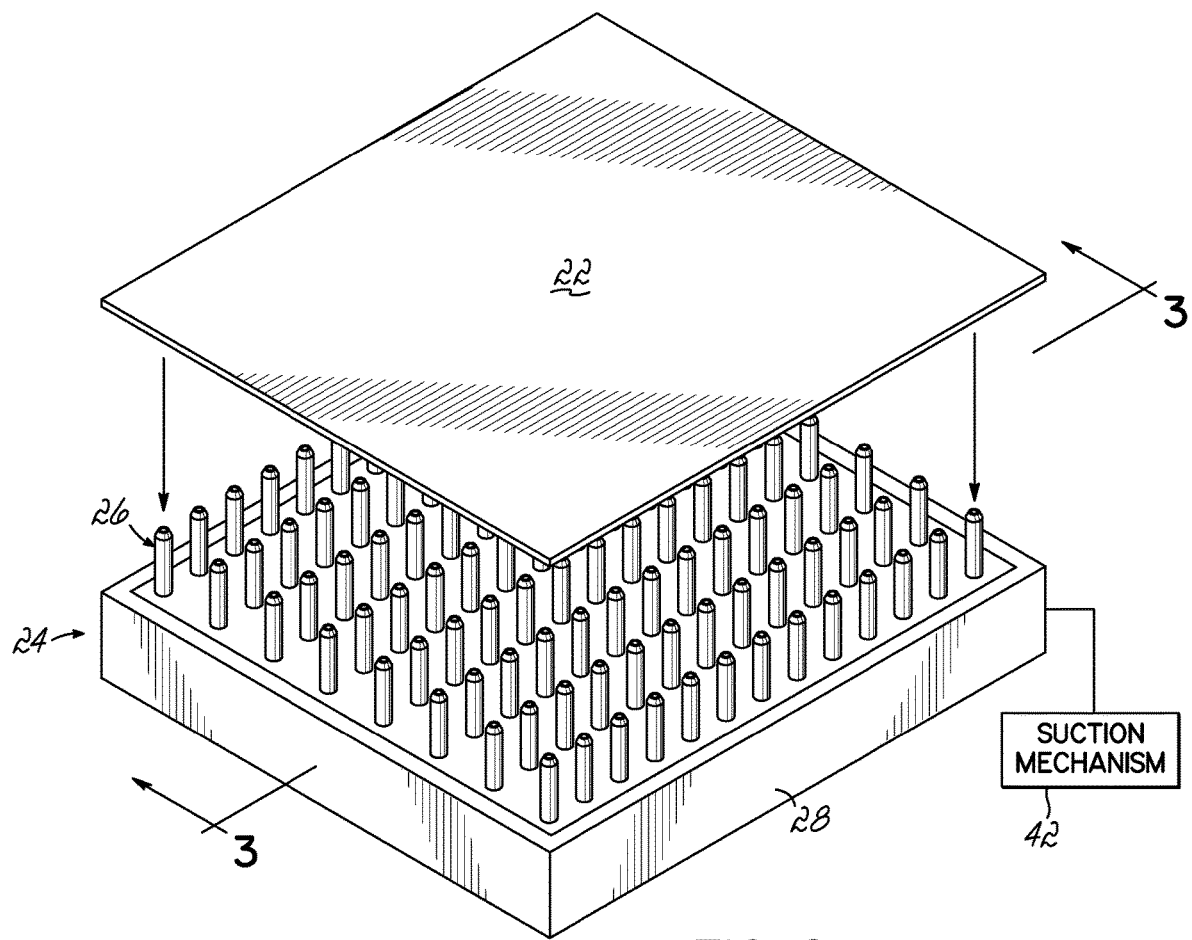
FIG. 2 is a perspective view of one embodiment of a needle bed and base on which a paperboard sheet is positioned for laser cutting in the system of FIG. 1 according to this invention.

FIG. 2 depicts one embodiment of a support assembly 24 for laser cutting of a work piece generally and a sheet of paperboard according to various embodiments of this invention. The support assembly 24 may support and stabilize the paperboard 22 in a fixed position while a laser's beam is working on or treating the paperboard 22. The support assembly 24 may include a number of upright, spaced elements, tubular members or needles 26, substantially parallel one to the other. The needles 26 may protrude from a base 28. Each needle has a tapered upper tip 30, an elongated slender body 32 and bottom end 34 apposite from the tip 30. A longitudinal lumen 36 is found in each needle 26 and is in communication with a port proximate the tip 30 of the needle 26. The paperboard 22 may be placed in a horizontal position on the tips 30 of the needles 26. The base 28 may have a housing 38 enclosing a void 40 which is in communication with the lumen 36 of each needle 26. The needles 26 may be spaced from each other and all be of substantially the same height.

Figure 3:
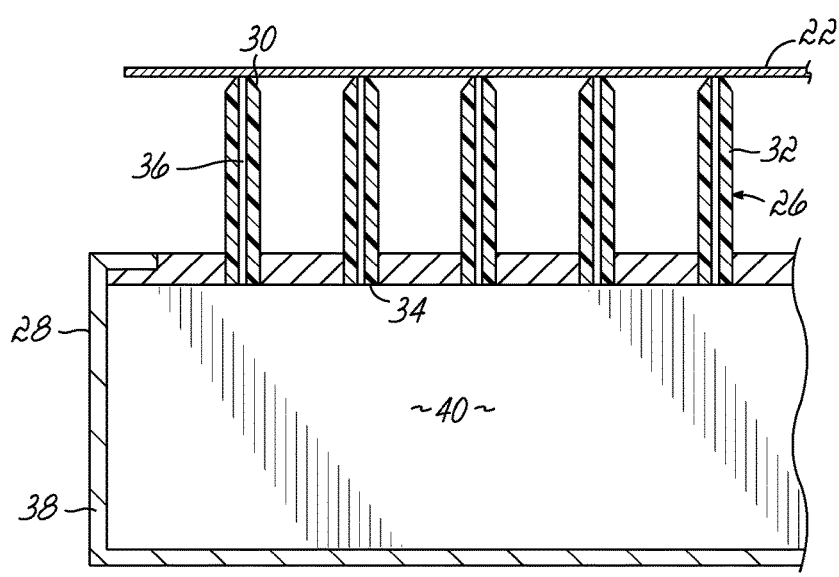
FIG. 3 is a cross-sectional view taken along line 3-3 of FIG. 2.

The support assembly 24 may include a vacuum generator or suction mechanism 42 in communication with the void 40 of the base 28. Suction mechanism 42 such as, but not limited to a vacuum generator may couple and stabilize the paperboard 22 to the top of the needles 26 as shown in FIG. 3.

The suction or vacuum generated in the void 40 of the base 28 is communicated from the base 28, through the lumens 36 of the needles 26 and ports and ultimately to the tops 30 of the needles to retain the paperboard 22 on top of the needles 26. The stable and stationary positioning of the paperboard on the needles 26 allows for the accurate and precise cutting of the paperboard 22 by the laser. Moreover, since the paperboard 22 is supported above the base 28 by the needles 26 during cutting, the laser does not scorch or mar the paperboard 22.

Additionally, once the cutting o other treatment of the paperboard 22 by the laser is completed, the vacuum generator may be reversed to produce a slight puff or flow of air through the lumens 36 to elevate the paperboard 22 for advancement from the support system 24 and toward the next station or module of the system 10. The laser may be used to cut entirely through the paperboard 22, cut partially through the paperboard 22, create a series of cuts or perforations in the paperboard 22 or any other treatment of the paperboard 22.

In exemplary embodiments the height of the needles 26 may be designed such that the focal point of the laser beam will not strike the base 28 of the support system 24, advantageously protecting the base 28 from the maximum heat of the laser beam. The top of the needles 26 may be designed to have a small surface such that if and/or when the laser beam hits the needle 26 it will hit only a small area. The length (height) of the needles 26 may also be designed such that if and/or when a laser beam strikes it the heat will cool along the length of the needle before reaching the base 28. Further, in some exemplary embodiments the material of the needles 26 and/or base 28 may be resistance to heat. The shape of the needles 26 may be diamond-like cross shape, narrower at the top end and at the base end in relation to the middle part of it, for example, and so on.

In some exemplary embodiments the material of the needle 26 and/or base 28 may be such that light will not reflect from it. In other exemplary embodiments part or the entire needle 26 and/or base 28 may be coated with anti-reflect coating.

Laser beam resistant material particles that will not reflect the laser light directly back to the paperboard but more in cross direction. This may defocus a laser beam that hits them, for example. The air flow may enable the vacuum from the vacuum generator 42 to remove the smoke away from the paperboard, and so on. Some of the embodiments may be a combination of two or more of the above, etc.

From the above disclosure of the general principles of this invention and the preceding detailed description of at least one embodiment, those skilled in the art will readily comprehend the various modifications to which this invention is susceptible. Therefore, I desire to be limited only by the scope of the following claims and equivalents thereof.

I claim:

1. A laser-treatment module for a work piece having a first face, the module comprising:
   a laser; and
   a support system comprising:
      a base;
      a plurality of tubular members extending away from the base, each tubular member having a distal end spaced from the base and with a port proximate to the distal end;
      a lumen within each tubular member in communication with the associated port; and
      a suction mechanism coupled to the lumen of each of the tubular members;

wherein when the first face of the work piece is juxtaposed to the distal ends of the plurality of tubular members, the work piece is retained atop the tubular members via a suction delivered to the first face through the ports while a beam from the laser treats the work piece.

2. The laser-treatment module of claim 1 wherein air flows toward the work piece in substantially perpendicular direction to a second face of the work piece.

3. The laser-treatment module of claim 1 wherein a height of the tubular members is adapted to avoid the laser heating the base.

4. The laser-treatment module of claim 1 wherein the ports are substantially covered by the first face of the work piece when positioned on the module.

5. The laser-treatment module of claim 1 wherein each of the ports is located a spaced distance from the base.

6. A laser-treatment module for a work piece having a first face, the module comprising:
   a laser; and
   a support system comprising:
      a base;
      a plurality of spaced tubular members extending away from the base, each tubular member having a distal end spaced from the base and with a port proximate to the distal end;
      wherein each of the ports is located a spaced distance from the base;
      a lumen within each tubular member in communication with the associated port; and
      a suction mechanism coupled to the lumen of each of the tubular members;
   wherein when the first face of the work piece is juxtaposed to the distal ends of the plurality of tubular members, the work piece is retained atop the tubular members via a suction delivered to the first face through the ports while a beam from the laser treats the work piece;
   wherein air flows toward the work piece in substantially perpendicular direction to a second face of the work piece;
   wherein a height of the tubular members is adapted to avoid the laser heating the base;
   wherein the ports are substantially covered by the first face of the work piece when positioned on the module.

7. A support system for holding a sheet of paperboard while being cut by a laser comprising:
   a base;
   a plurality of tubular members extending away from the base, each tubular member having a distal end spaced from the base and with a port proximate to the distal end;
   a lumen within each tubular member in communication with the associated port; and
   a suction mechanism coupled to the lumen of each of the tubular members;
   wherein when the first face of the sheet of paperboard is juxtaposed to the distal ends of the plurality of tubular members, the sheet of paperboard is retained atop the tubular members via a suction delivered to the first face through the ports while a beam from the laser cuts the sheet of paperboard.

8. The support system of claim 7 wherein air flows toward the sheet of paperboard in substantially perpendicular direction to a second face of the sheet of paperboard.

9. The support system of claim 7 wherein a height of the tubular members is adapted to avoid the laser heating the base.

10. The support system of claim 7 wherein the ports are substantially covered by the first face of the sheet of paperboard when positioned on the tubular members.

11. The support system of claim 7 wherein each of the ports is located a spaced distance from the base.

12. A support system for holding a sheet of paperboard while being cut by a laser comprising:
   a base;
   a plurality of spaced tubular members extending away from the base, each tubular member having a distal end spaced from the base and with a port proximate to the distal end;
   wherein each of the ports is located a spaced distance from the base;
   a lumen within each tubular member in communication with the associated port; and
   a suction mechanism coupled to the lumen of each of the tubular members;
   wherein when the first face of the sheet of paperboard is juxtaposed to the distal ends of the plurality of tubular members, the sheet of paperboard is retained atop the tubular members via a suction delivered to the first face through the ports while a beam from the laser treats the sheet of paperboard;
   wherein air flows toward the sheet of paperboard in substantially perpendicular direction to a second face of the sheet of paperboard;
   wherein a height of the tubular members is adapted to avoid the laser heating the base;
   wherein the ports are substantially covered by the first face of the sheet of paperboard when positioned on the module.

13. The module of claim 1 wherein the work piece is stationary atop the plurality of tubular members while the beam from the laser treats the work piece.

14. The module of claim 1 wherein the each of the plurality of tubular members has a tapered upper tip.

15. The module of claim 1 wherein the plurality of tubular members are all substantially the same height.

16. The module of claim 1 wherein each tubular member further comprises an elongated slender body.

* * * * *